(12) United States Patent
Ocheltree

(10) Patent No.: US 12,165,523 B2
(45) Date of Patent: Dec. 10, 2024

(54) SYSTEMS AND METHODS FOR TRACKING OBJECTS RELATIVE TO AN AIRCRAFT WITHIN AN AIR SPACE

(71) Applicant: Aurora Flight Sciences Corporation, Manassas, VA (US)

(72) Inventor: Christopher Ocheltree, Manassas, VA (US)

(73) Assignee: AURORA FLIGHT SCIENCES CORPORATION, A SUBSIDIARY OF THE BOEING COMPANY, Manassas, VA (US)

( * ) Notice: Subject to any disclaimer, the term of this patent is extended or adjusted under 35 U.S.C. 154(b) by 422 days.

(21) Appl. No.: 17/565,532

(22) Filed: Dec. 30, 2021

(65) Prior Publication Data

US 2022/0292988 A1    Sep. 15, 2022

Related U.S. Application Data

(60) Provisional application No. 63/160,961, filed on Mar. 15, 2021.

(51) Int. Cl.
| | |
|---|---|
| *G08G 5/00* | (2006.01) |
| *G01S 17/933* | (2020.01) |
| *G06F 11/07* | (2006.01) |
| *G06F 11/30* | (2006.01) |
| *G06V 20/17* | (2022.01) |

(52) U.S. Cl.
CPC .......... *G08G 5/0004* (2013.01); *G01S 17/933* (2013.01); *G08G 5/0047* (2013.01); *G06F 11/0739* (2013.01); *G06F 11/3013* (2013.01); *G06V 20/17* (2022.01)

(58) Field of Classification Search
CPC .. G08G 5/0004; G08G 5/0047; G01S 17/933; G06V 20/17; G06F 11/0739; G06F 11/3013

See application file for complete search history.

(56) References Cited

U.S. PATENT DOCUMENTS

| | | |
|---|---|---|
| 2017/0001732 A1 | 1/2017 | Lim |
| 2017/0261999 A1* | 9/2017 | Van Voorst .......... G05D 1/0016 |
| | (Continued) | |

OTHER PUBLICATIONS

Extended European Search Report for EP 22195631.1-1206, dated Feb. 15, 2023.

*Primary Examiner* — Shefali D Goradia
(74) *Attorney, Agent, or Firm* — Joseph M. Butscher; The Small Patent LAw Group, LLC

(57) ABSTRACT

A system includes a first sensor configured to detect an object within an air space, and output an observation signal indicative of the object within the air space. A second sensor is configured to track the object within the air space, and output a tracking signal of the object within the air space. A tracking control unit is in communication with the first sensor and the second sensor. The tracking control unit is configured to receive the observation signal from the first sensor. In response to receiving the observation signal from the first sensor, the tracking control unit is configured to operate the second sensor to track the object within the air space relative to an aircraft within the air space. The tracking control unit is also configured to determine a priority of actions to take in relation to the object based, at least in part, on the tracking signal received from the second sensor.

22 Claims, 6 Drawing Sheets

(56) References Cited

U.S. PATENT DOCUMENTS

| | | | |
|---|---|---|---|
| 2018/0181125 A1* | 6/2018 | Ceccom | G08G 5/045 |
| 2019/0217791 A1 | 7/2019 | Bradley | |
| 2020/0242315 A1* | 7/2020 | George | G06K 7/10475 |
| 2023/0144415 A1* | 5/2023 | Connell | G01S 17/66 |
| | | | 382/100 |
| 2023/0286140 A1* | 9/2023 | Usui | B25J 19/023 |

* cited by examiner

SYSTEMS AND METHODS FOR TRACKING OBJECTS RELATIVE TO AN AIRCRAFT WITHIN AN AIR SPACE

CROSS-REFERENCE TO RELATED APPLICATIONS

This application relates to and claims priority benefits from U.S. Provisional Patent Application No. 63/160,961, filed Mar. 15, 2021, which is hereby incorporated by reference in its entirety.

FIELD OF THE DISCLOSURE

Examples of the subject disclosure generally relate to systems and methods for tracking objects relative to an aircraft within an air space.

BACKGROUND OF THE DISCLOSURE

As an aircraft flies within an air space, a sensor is used to detect the presence of other objects (such as other aircraft) relative to the aircraft within the air space. For example, a radar is used to detect the presence of such objects.

As another example, an electro-optical infrared (EO/IR) sensor can be used to track objects within the air space. Such a sensor can be mounted on or within an aircraft traveling through the air space. The EO/IR sensor is commonly used to detect objects through relative motion. However, such sensors are susceptible to false positives, due to noise.

SUMMARY OF THE DISCLOSURE

A need exists for a system and a method for accurately and effectively tracking objects within an air space. A need exists for a system and method that is less susceptible to false positives.

With those needs in mind, certain examples of the subject disclosure provide a system including a first sensor configured to detect an object within an air space, and output an observation signal indicative of the object within the air space. A second sensor is configured to track the object within the air space, and output a tracking signal of the object within the air space. A tracking control unit is in communication with the first sensor and the second sensor. The tracking control unit is configured to receive the observation signal from the first sensor. In response to receiving the observation signal from the first sensor, the tracking control unit is configured to operate the second sensor to track the object within the air space relative to an aircraft within the air space.

In at least one example, the tracking control unit is further configured to determine a priority of actions to take in relation to the object based on the tracking signal received from the second sensor.

In at least one example, the tracking control unit is further configured to: receive the tracking signal from the second sensor, and correlate observation data of the observation signal with tracking data of the tracking signal. The tracking control unit is further configured to determine whether a track file is confirmed or unconfirmed.

In at least one example, the tracking control unit is further configured to, in response to determining that the track file is confirmed, compute a velocity and a position of the object within the air space. As an example, the tracking control unit is further configured to compute the velocity and the position of the object within the air space by using the observation signal from the first sensor and the tracking signal from the second sensor.

In at least one example, the tracking control unit is further configured to update the track file based on priority of the track file. For example, a first priority of the track file, if confirmed, is higher than a second priority of the track file, if unconfirmed.

In at least one example, the first sensor is an electro-optical/infrared (EO/IR) sensor, and the second sensor is a light detection and ranging (LIDAR) sensor. As an example, the aircraft includes the first sensor, the second sensor, and the tracking control unit.

Certain examples of the subject disclosure provide a method including receiving, by a tracking control unit, an observation signal from a first sensor in communication the tracking control unit; and in response to said receiving the observation signal from the first sensor, operating, by the tracking control unit, a second sensor to track the object within the air space relative to an aircraft within the air space. In at least one example, the method also includes determining, by the tracking control unit, a priority of actions to take in relation to the object based on the tracking signal received from the second sensor.

Certain examples of the present disclosure provide a non-transitory computer-readable storage medium comprising executable instructions that, in response to execution, cause one or more control units comprising a processor, to perform operations comprising: receiving, by a tracking control unit, an observation signal from a first sensor; and in response to said receiving the observation signal from the first sensor, operating a second sensor, by the tracking control unit, to track the object within the air space relative to an aircraft within the air space.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the subject disclosure provide a system and a method for tracking one or more objects within an air space. The system and method include multiple sensors to track the objects. The systems and methods track objects within an air space through fusion of data received from multiple sensors. In at least one example, the systems and methods also track updates based on predetermined priority.

As an example, the system and method include an electro-optical/infrared (EO/IR) sensor as the first sensor. The EO/IR sensor measures angles and angular rates for an object relative to the EO/IR sensor. A perception algorithm is run with respect to the EO/IR sensor that generates an observation, which may be correlated to an existing track. The second sensor is a light detection and ranging (LIDAR) sensor. The LIDAR sensor is used to confirm the observation. Once an observation is confirmed, a confirmed track file is created. Otherwise, an unconfirmed track file is created. A correlation algorithm analyzes the observation from the EO/IR sensor and the data from the LIDAR sensor to correlate with existing tracks. If an observation cannot be associated, the algorithm requests a confirmation step. If the observations is correlated with an existing track file, a Kalman filter can be used to update the track file with the observation.

A track file is confirmed when a valid range measurement in relation to an object of the track file is acquired. For example, when a second sensor acquires a range measurement in relation to the object, the track file is confirmed. Conversely, when a valid range measurement in relation to the object is not acquired, the track file is unconfirmed.

Figure 1:
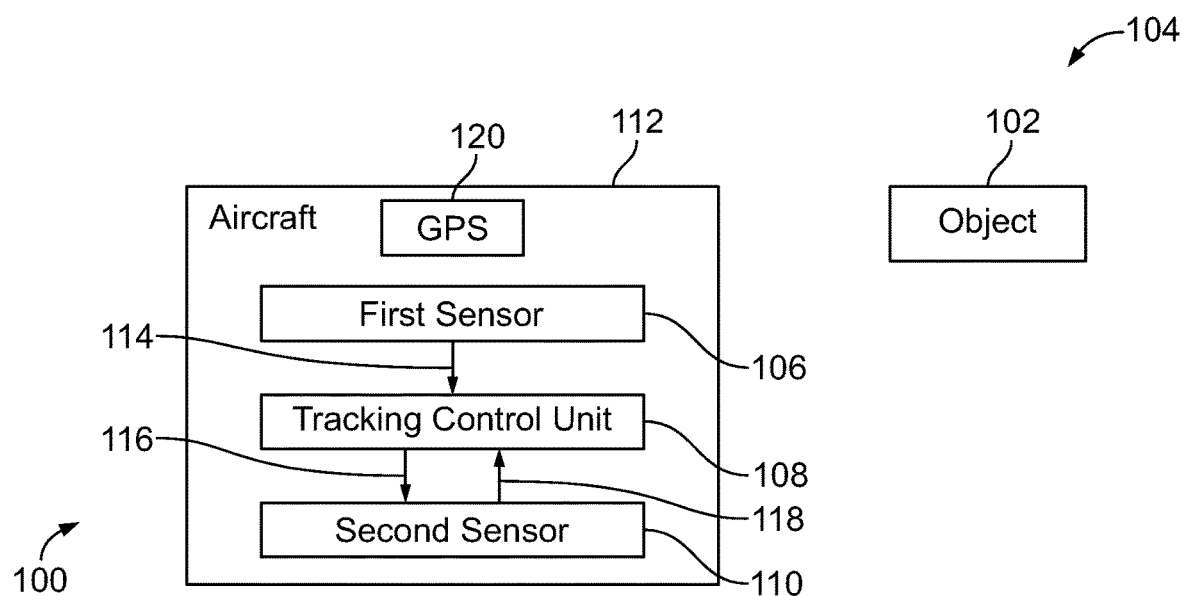
FIG. 1 illustrates a schematic block diagram of a system for tracking an object within an air space, according to an example of the subject disclosure.

FIG. 1 illustrates a schematic block diagram of a system 100 for tracking one or more objects 102 within an air space 104, according to an example of the subject disclosure. The system 100 includes a first sensor 106 in communication with a tracking control unit 108, such as through one or more wired or wireless connections. A second sensor 110 is also in communication with the tracking control unit 108, such as through one or more wired or wireless connections.

As shown, in at least one example, the first sensor 106, the tracking control unit 108, and the second sensor 110 are onboard an aircraft 112. That is, the aircraft 112 includes the first sensor 106, the tracking control unit 108, and the second sensor 110. In at least one example, the aircraft 112 is a commercial aircraft. As another example, the aircraft 112 can be other types of aircraft. As another example, the aircraft 112 can be an unmanned aerial vehicle (UAV).

The object 102 can be moving within the air space 104. For example, the object 102 within the air space 104 can be another aircraft, a UAV, or the like. As another example, the object 102 can be a projectile. As another example, the object 102 can be one or more birds, such as a flock of birds.

In at least one example, the first sensor 106 is an angular sensor, such as is configured to detect and track an angular position of one object in relation to another object. For example, the first sensor 106 is an EO/IR sensor. As another example, the first sensor 106 can be a passive radio frequency (RF) sensor. As another example, the first sensor 106 can be an ultrasonic sensor. As another example, the first sensor 106 can be a radar sensor. In at least one example, the first sensor 106 is configured to detect and track the object 102 within the air space 104.

In at least one example, the second sensor 106 is a range measuring sensor that is configured to detect a range of an object in relation to another object. For example, the second sensor 106 is a LIDAR sensor. As another example, the second sensor 106 can be an automatic dependent surveillance-broadcast (ADS-B) sensor. In at least one example, the second sensor 106 is configured to confirm and track the object 102 within the air space 104.

In at least one example, the first sensor 106 is an EO/IR sensor, and the second sensor 110 is a LIDAR sensor. In operation, the first sensor 106 and the second sensor 110 are used in conjunction with one another to accurately track the object 102 within the air space 104. For example, the second sensor 110 (such as the LIDAR sensor) confirms detection of the object 102 and is used to update tracks with range and range rate measurements. The second sensor 110 confirms observations, such as from the first sensor 106, confirms unconfirmed track files, and updates existing track files, which can be based on priority as determined by the tracking control unit 108.

As an example, the first sensor 106 detects the object 102 within the air space 104. In response to the first sensor 106 detecting the object 102, the first sensor 106 outputs an observation signal 114 to the tracking control unit 108. The observation signal 114 is indicative of a tracked position of the object 102 within the air space 104, as detected by the first sensor 106. If the observation included in the observation signal 114 cannot be correlated with any existing track, a confirm look request is sent to the tracking control unit 108 (such as from the first sensor 106), which then controls the second sensor 110. For example, in response to receiving the observation signal 114, the tracking control unit 108 outputs an activation signal 116 to the second sensor 110. In response to receiving the activation signal 116, the second sensor 110 is activated and is operated (such as by the tracking control unit 108) to track the object 102 within the air space 104. For example, in response to receiving the observation signal 114, the tracking control unit 108 outputs the activation signal 116 to activate the second sensor 110, and commands and operates the second sensor 110 to track the object 102 within the air space 104. As a further example, the tracking control unit 108 also operates the second sensor 110 when track files need updates, not just in response to an observation. In at least one example, the second sensor 110 is not activated and operated until the tracking control unit 108 receives the observation signal from the first sensor 106. That is, the second sensor 110 is triggered by the first sensor 110 outputting the observation signal 114. As the second sensor 110 is operated by the tracking control unit 108 to track the object 102, the second sensor 110 outputs a tracking signal 118 to the tracking control unit 108. The tracking signal 118 is indicative of the tracked position of the object 102, as detected by the second sensor 110. The tracking control unit 108 analyzes the tracking signal 118 to determine the position and trajectory of the object within the air space 104 relative to the aircraft 112. Additionally, the second sensor 110 may output no observations during a confirmation look, and an angle only unconfirmed track is created instead.

In at least one example, a "look" is a command for the second sensor 110 to be directed (that is, look) at point in space where the first sensor 106 made an observation. A look can be performed with respect to an existing track (for example, an update look) or to confirm a track (for example, a confirm look).

In at least one example, the second sensor 110 performs: (1) an update look to update a confirmed track file, (2) a confirm look in relation to an existing angle-only track file to see if it can be confirmed, and (3) a confirm look in relation to a new angle-only observation that does not correlate to any existing track files to see if a new confirmed or unconfirmed track file should be created (for example, if there is a valid return from the second sensor 110, the track file is confirmed, otherwise it is unconfirmed).

The observation signal 114 as output by the first sensor 106 causes the second sensor 110 to track the object 102. The second sensor 110 is used to track the position of the object 102 in order to determine whether or not the observation signal 114 is accurate, for example. The second sensor 110 is commanded by the tracking control unit 108, in response to receipt of the observation signal 114 from the first sensor 106, to track the object 102, and adaptively schedule track updates of the object 102 based on predetermined priority, as described herein.

Examples of the subject disclosure provide the second sensor 110, such as a LIDAR sensor, that assists in track file creation. A track file includes position data and velocity data of an object 102 within the air space 104. Numerous objects 102 can be within the air space 104. A track file is created for the objects 102 within the air space 104.

In at least one example, the second sensor 110, such as in conjunction with the tracking control unit 108, performs an update look to update a confirmed track file. The second sensor 110 also performs a confirm or confirmation look on an existing track file (such as an existing angle-only track file) to determine if the existing track file can be confirmed. The second sensor 110 also performs a confirm or confirmation look on a new observation (such as a new angle-only observation) that does not correlate to any existing track files to determine if a new confirmed or unconfirmed track file should be created.

In at least one example, the presence of an observation from the second sensor 110 that is correlated to a track file (such as an angle-only track file) generated from the first sensor 106 determines if the track is confirmed or unconfirmed.

In at least one example, the first sensor 106 and the second sensor 110 both make observations, and both track the object 102. The observations from both the first sensor 106 and the second sensor 110 are correlated to a track file to update the track file. The second sensor 110 is steered by the tracking control unit 108 based on the first sensor 106 (such as the tracking control unit 108 receiving the observation signal 114 from the first sensor 106). For example, the second sensor 110 can continuously scan the air space 104. The observation signal 114 output by the first sensor 106 is used to steer the second sensor 110 with respect to the object 102.

In at least one example, the first sensor 106, such as an EO/IR sensor, provides an initial set of observations, as included in the observation signal 114. In response to the observations generated by the first sensor 106, the second sensor 110 is activated to confirm the observations. In at least one example, correlated observations from both the first sensor 106 and the second sensor 110 are turned into track files, which can be stored in a memory of the tracking control unit 108.

In at least one example, the tracking control unit 108 is configured to determine a priority of actions to take in relation to the object 102 based on the tracking signal 118 received from the second sensor 110. For example, if the tracking signal 118 is within a predetermined range (for example, the second sensor 110 is able to determine a range of the object 102), the track file is confirmed. Confirmed tracks receive increased priority for repeated tracking from the second sensor 110, such as to ensure accurate tracking of known targets. Unconfirmed tracks (such as those in which the second sensor 110 is unable to determine range, is not commented to determine, does not attempt to determine, or the like) are of lower priority. Actions with respect to confirmed tracks (such as periodic updates and monitoring) are prioritized over those of unconfirmed tracks.

The first sensor 106, such as the EO/IR sensor, detects angle and angle rate measurements of the object 102, which are included in the observation signal 114 received and analyzed by the tracking control unit 108. The second sensor 110, such as the LIDAR sensor, detects range and range rate measurements of the object 102, which are included in the tracking signal 118. The tracking control unit 108 then analyzes the angle and angle rate measurements of the observation signal 114 and the range and range rate measurements of the tracking signal 118 to determine the velocity and position of the object 102 within the air space 104. As such, the system 100 allows for accurate extrapolation of data, such as velocity and position data, of the object 102 within the air space 104.

Unconfirmed tracks of objects within the air space are periodically checked by the second sensor 110, with increasing frequency if the object is determined to be aircraft-like. For example, in at least one example, a track of an object 102 is considered aircraft-like, for example, if it falls within certain velocity, size, shape, and/or infrared signature ranges (data of which is as stored in the memory of the tracking control unit 108) and a weighted score can be created from comparison between tracks.

In at least one example, the tracking control unit 108 schedules activation and use of the second sensor 110, such as the LIDAR sensor, and controls the second sensor to focus on the object 102 within the air space 104 based on the observations as detected by the first sensor 106, such as the EO/IR sensor. In at least one example, the LIDAR sensor is a phased array LIDAR sensor that is configured to steer a beam instantly, as opposed to a mechanically pointed device. As such, the LIDAR sensor is able to confirm and update more tracks at a faster rate than a mechanically pointed device.

As noted, the tracking control unit 108 is in communication with the first sensor 106 and the second sensor 110. The tracking control unit 108 includes or is otherwise in communication with a memory that stores instructions, for example. The first sensor 106, such as the EO/IR sensor, runs a perception algorithm to create observations, such as of the object 102 within the air space 104. In response to the tracking control unit 108 receiving the observations (such as within the observation signal 114) from the first sensor 106, the tracking control unit 108 commands the second sensor 110, such as the LIDAR sensor, to focus on or otherwise point at the object 102. The tracking control unit 108 combines the measurements from the first sensor 106 and the second sensor 110 into a single track file. For example, the tracking control unit 108 combines the observation signal 114 from the first sensor 106 and the tracking signal 118 from the second sensor 110 into the track file related to the object 102 within the air space 104.

In at least one example, a track file is either confirmed or unconfirmed if a range measurement is able to be made by the second sensor 110. For example, if the second sensor 110 is able to make a range measurement with respect to the object, the track file is confirmed. If, however, the second sensor 110 is unable to or is not commended/attempted to make the range measurement, the track file is unconfirmed.

As another example, the tracking control unit 108 then compares the track file with confirmation data stored in the memory. The confirmation data relates to predetermined known objects, such as aircraft based on size, shape, speed, infrared signature and/or the like. If the track file matches or is otherwise consistent with the confirmation data for an object (such as an aircraft, projectile, or the like), the tracking control unit 108 confirms the track file. If, however, the track file does not match or is otherwise inconsistent with the confirmation data for the object, the tracking control unit 108 designates the tracking file as unconfirmed.

In response to confirming the track file (that is, determining that the track file is confirmed), the tracking control unit 108 computes the velocity and the position of the object 102 within the air space 104, such as by using the observation signal 114 from the first sensor 106 (for example, the EO/IR sensor), and the tracking signal 118 from the second sensor 110 (for example, the LIDAR sensor).

In at least one example, the aircraft 112 also includes a global positioning system (GPS) 120 that is configured to detect the velocity and position of the aircraft 112 within the air space 104. The GPS 120 is in communication with the tracking control unit 108, such as through one or more wired or wireless signals. The tracking control unit 108 determines the velocity and position of the aircraft 112 from signals received from the GPS 120.

In at least one example, the tracking control unit 108 schedules updates to range measurements for the track files from the second sensor 110. The frequency of the updates are determined by priority, such as can be stored in memory as priority data. As an example, confirmed track files (for example, confirmed as aircraft) have a first or highest priority. Unconfirmed aircraft-like track files have a second priority, which is lower than the first priority. Examples of the unconfirmed aircraft-like track files include objects which have at least some characteristics (for example, velocity, infrared signature, or the like) similar to known aircraft, but cannot be conclusively confirmed as aircraft based on data stored in the memory. Unconfirmed tracks have a third priority, which is lower than the second priority. In at least one example, priority can also be influenced by Kalman filter errors of individual track files.

As noted, in at least one example, the first sensor 106 is an EO/IR sensor, and the second sensor 110 is a LIDAR sensor. Raw output from the EO/IR sensor is run through perception algorithm, such as stored within the memory of the tracking control unit 108, to make observations, which are correlated to make tracks. The EO/IR sensor measures relative azimuth/elevation and azimuth/elevation rates of the object 102 in relation to the aircraft 112. The EO/IR sensor also measures the shape and size of the object 102.

The LIDAR sensor measures range and range rate of the object 102 within a predetermined range. For example, the predetermined range of the LIDAR sensor is 1 mile. As another example, the predetermined range of the LIDAR sensor is 5 miles. As another example, the predetermined range of the LIDAR sensor is 10 miles. Optionally, the predetermined range of the LIDAR sensor can be less than 1 mile or more than 10 miles. The LIDAR sensor is used to confirm that an observation from the EO/IR sensor is not noise and/or a false alarm and is within a range of interest (for example, in order to detect and avoid the object 102 within the air space 104). In at least one example, the LIDAR sensor is dynamically scheduled by the tracking control unit 108 to track the object 102.

The GPS 120 is used to calculate position and velocity of the aircraft 112 within the air space 104. In at least one example, GPS data for the aircraft 112 is used to turn relative velocity/position data to a track file to absolute velocity/position data.

The tracking control unit 108 is used to control the first sensor 106 and the second sensor 110, as described herein, processes inputs, hosts perception algorithm (used for identifying objects from the EO/IR sensor), performs track file creation and maintenance (extrapolation, filtering and/or the like), schedules and prioritizes LIDAR measurements, and the like.

As described herein, the system 100 includes the first sensor 106, which is configured to detect the object within the air space 104 and output the observation signal 114 indicative of the object 102 within the air space 104. The second sensor is configured to track the object 102 within the air space 104 and output the tracking signal 118 of the object 102 within the air space 104. The tracking control unit 108 is in communication with the first sensor 106 and the second sensor 110. The tracking control unit 108 is configured to receive the observation signal 114 from the first sensor 106. In response to receiving the observation signal 114 from the first sensor 106, the tracking control unit 108 is configured to activate and operate the second sensor 110 to track the object 102 within the air space 104 relative to the aircraft 112 within the air space 104.

In at least one example, the tracking control unit 108 is further configured to receive the tracking signal 118 from the second sensor 110. The tracking control unit is further configured to correlate observation data of the observation signal 114 with tracking data of the tracking signal 118 to confirm the observation and create a track file with respect to the object 102. In at least one example, the track file is created whether or not the observation is confirmed. For example, a track file is created from an observation signal, such as from the first sensor 106, if no range data is available (for example, the observation could not be confirmed).

In at least one example, the tracking control unit 108 is further configured to compare the track file with confirmation data stored in a memory to determine whether the track file is confirmed or unconfirmed. In at least one example, the confirmation data includes one or more other track files.

In at least one example, the tracking control unit 108 is further configured to, in response to determining that the track file is confirmed, compute a velocity and a position of the object within the air space. For example, the tracking control unit 108 computes the velocity and the position of the object within the air space by using the observation signal from the first sensor and the tracking signal from the second sensor.

In at least one example, the tracking control unit 108 is further configured to update the track file based on priority of the track file. For example, a first priority of the track file, if confirmed, is higher than a second priority of the track file, if unconfirmed.

In at least one exemplary example, the system 100 includes the first sensor 106 that outputs a first signal, such as the observation signal. The second sensor 110 outputs a second signal, such as the tracking signal. The tracking control unit 108 is in communication with the first sensor 106 and the second sensor 110. The tracking control unit 108 is configured to receive the first and second signals. The tracking control unit 108 is further configured to detect the object 102 within the air space using the first signal. The tracking control unit 108 is further configured to verify and confirm the object 102 within the air space 104 using the second signal. Further, the tracking control unit 108 is further configured to track the object 102. Examples of the subject disclosure provide systems and methods for improving tracking accuracy by correlating, confirming, and prioritizing data.

Figure 2:
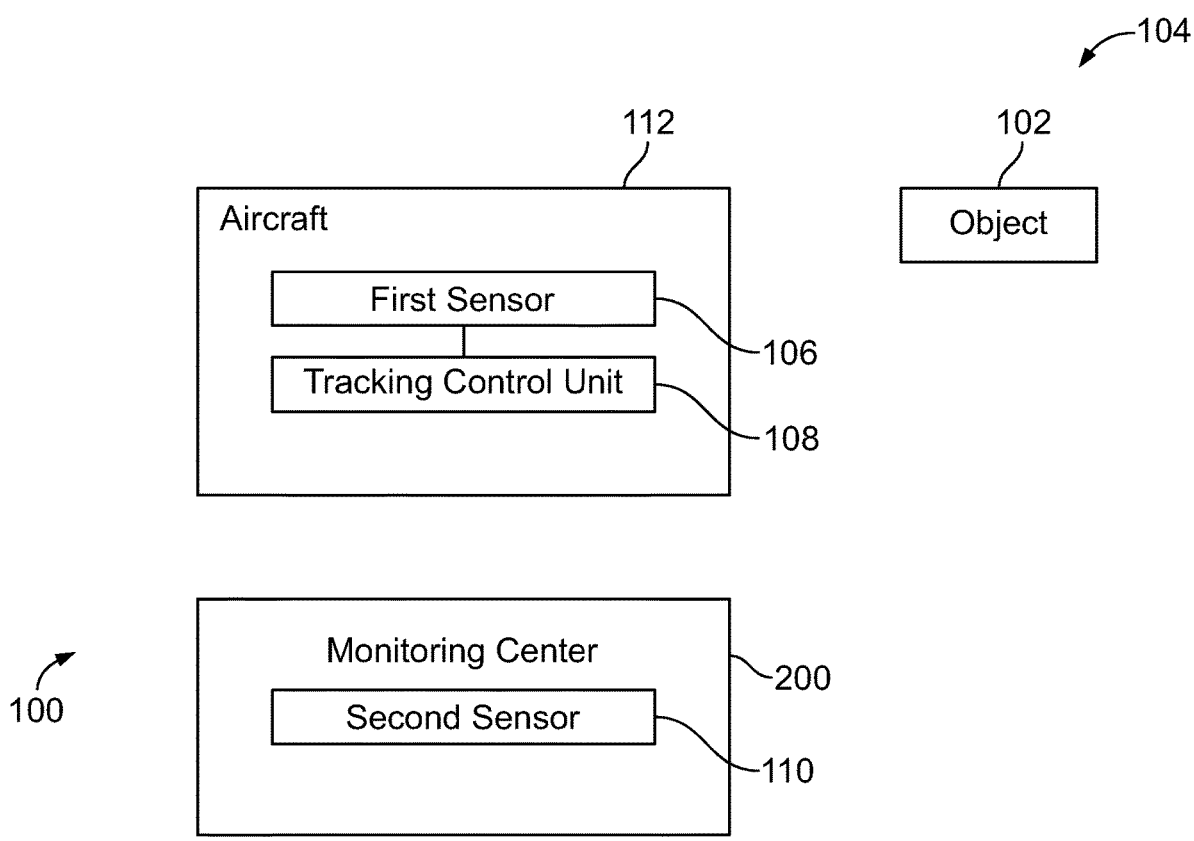
FIG. 2 illustrates a schematic block diagram of the system for tracking the object within the air space, according to an example of the subject disclosure.

FIG. 2 illustrates a schematic block diagram of the system 100 for tracking the object 102 within the air space 104, according to an example of the subject disclosure. In this example, the aircraft 112 includes the first sensor 106 and the tracking control unit 108. A monitoring center 200 is remotely located from the aircraft 112. The monitoring center 200 can be land-based, water-based, or air-based. The monitoring center 200 includes the second sensor 110, which is in communication with the tracking control unit 108. The system 100 shown in FIG. 2 operates as described above with respect to FIG. 1, except that the monitoring center 200 includes the second sensor 110.

Figure 3:
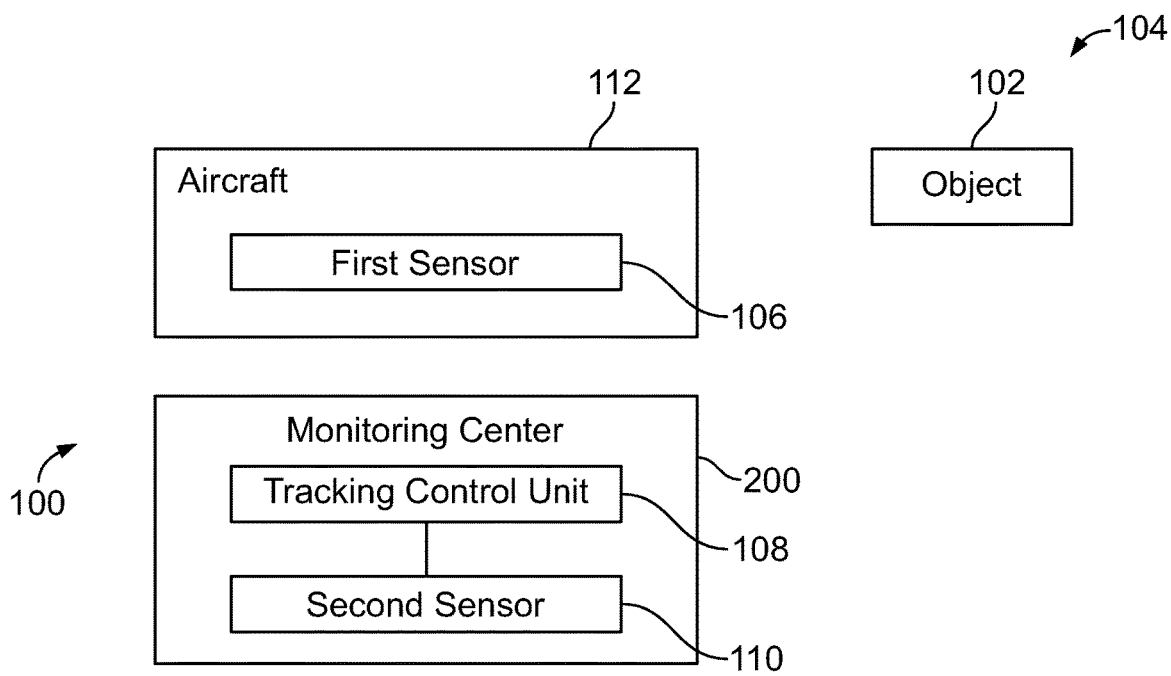
FIG. 3 illustrates a schematic block diagram of the system for tracking the object within the air space, according to an example of the subject disclosure.

FIG. 3 illustrates a schematic block diagram of the system 100 for tracking the object 102 within the air space 104, according to an example of the subject disclosure. In this example, the monitoring center 200 includes the tracking control unit 108 and the second sensor 110. The first sensor 106 of the aircraft 112 is in communication with the tracking control unit 108. The system 100 shown in FIG. 3 operates as described above with respect to FIG. 1, except that the monitoring center 200 includes the tracking control unit 108 and the second sensor 110.

Figure 4:
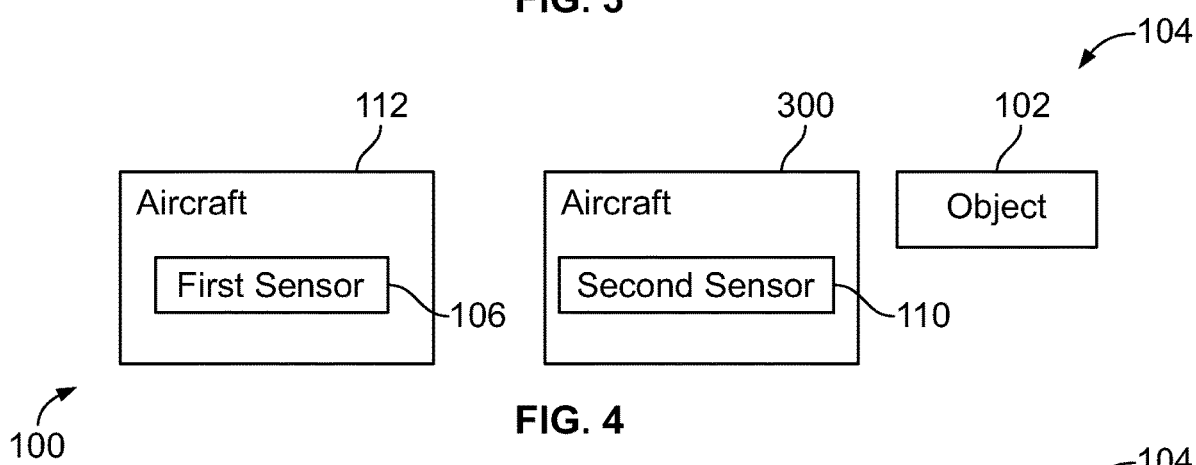
FIG. 4 illustrates a schematic block diagram of the system for tracking the object within the air space, according to an example of the subject disclosure.

FIG. 4 illustrates a schematic block diagram of the system 100 for tracking the object 102 within 104 air space, according to an example of the subject disclosure. In this example, the aircraft 112 includes the first sensor 106, and a second aircraft 300 includes the second sensor 110. The aircraft 112 or the aircraft 300 includes the tracking control unit 108 (shown in FIGS. 1-3). For example, the second aircraft 300 can be a monitoring aircraft that flies at altitudes above the first aircraft 112.

Figure 5:
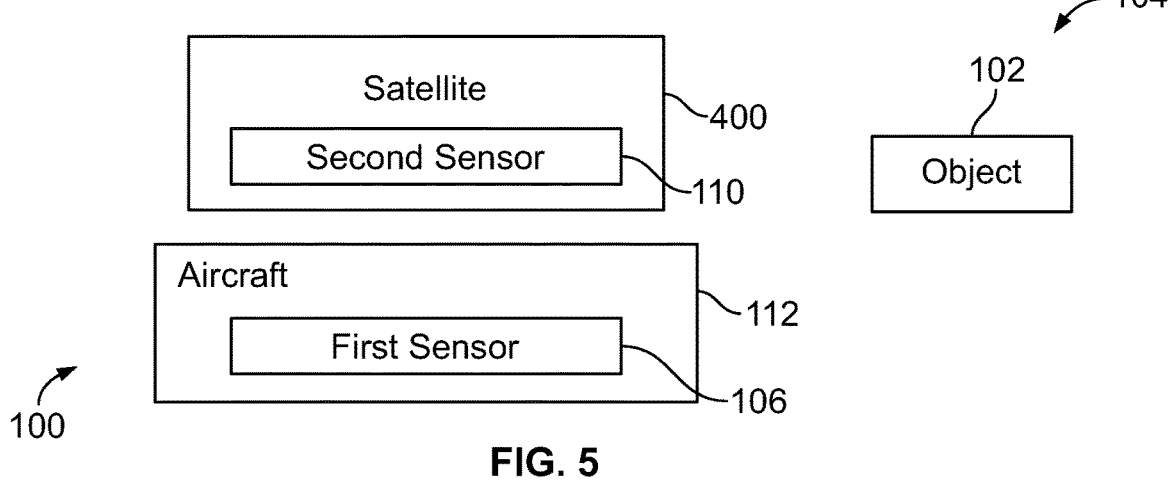
FIG. 5 illustrates a schematic block diagram of the system for tracking the object within the air space, according to an example of the subject disclosure.

FIG. 5 illustrates a schematic block diagram of the system 100 for tracking the object 102 within the air space 104, according to an example of the subject disclosure. In this example, the aircraft 112 includes the first sensor 106, while a satellite 400 (such as a geosynchronous satellite) includes the second sensor 110. The aircraft 112 or the satellite 400 includes the tracking control unit 108 (shown in FIGS. 1-3).

Figure 6:
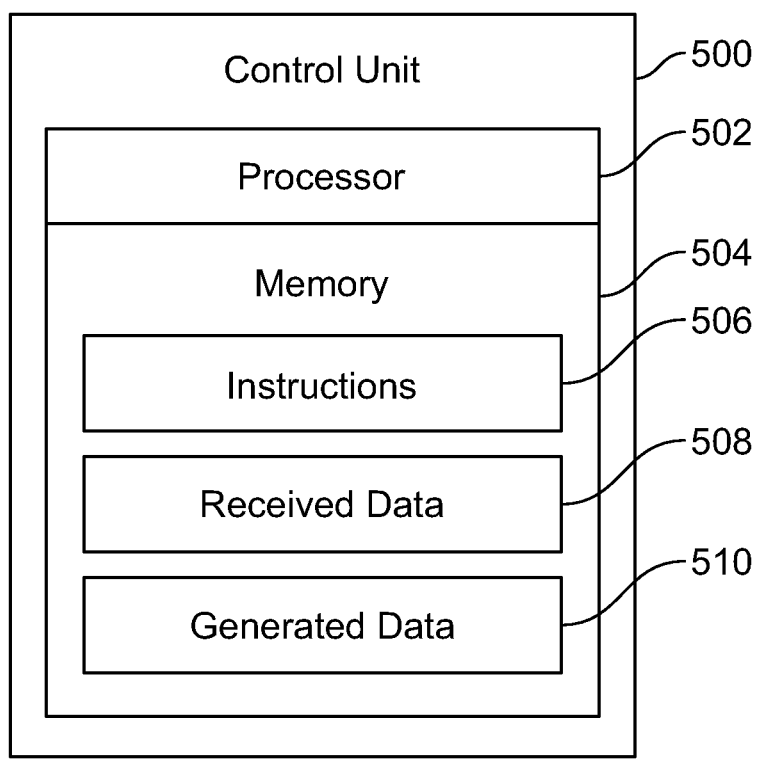
FIG. 6 illustrates a schematic block diagram of a control unit, according to an example of the subject disclosure.

FIG. 6 illustrates a schematic block diagram of a control unit 500, according to an example of the subject disclosure. In at least one example, the tracking control unit 108 (shown in FIGS. 1-3) is configured as shown in FIG. 6. In at least one example, the control unit 500 includes at least one processor 502 in communication with a memory 504. The memory 504 stores instructions 506, received data 508, and generated data 510. The control unit 500 shown in FIG. 6 is merely exemplary, and non-limiting.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the tracking control unit 108 can be or include one or more processors that are configured to control operation thereof, as described herein.

The control unit(s), such as the tracking control unit 108, are configured to execute a set of instructions that are stored in one or more data storage units or elements (such as one or more memories), in order to process data. For example, the tracking control unit 108 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the non-volatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the control unit(s), such as the tracking control unit 108, as a processing machine to perform specific operations such as the methods and processes of the various examples of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of examples herein can illustrate one or more control or processing units, such as the tracking control unit 108. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit(s), such as the tracking control unit 108, can represent processing circuitry such as one or more of a field programmable gate array (FPGA), application specific integrated circuit (ASIC), microprocessor(s), and/or the like. The circuits in various examples can be configured to execute one or more algorithms to perform functions described herein. The one or more algorithms can include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 7:
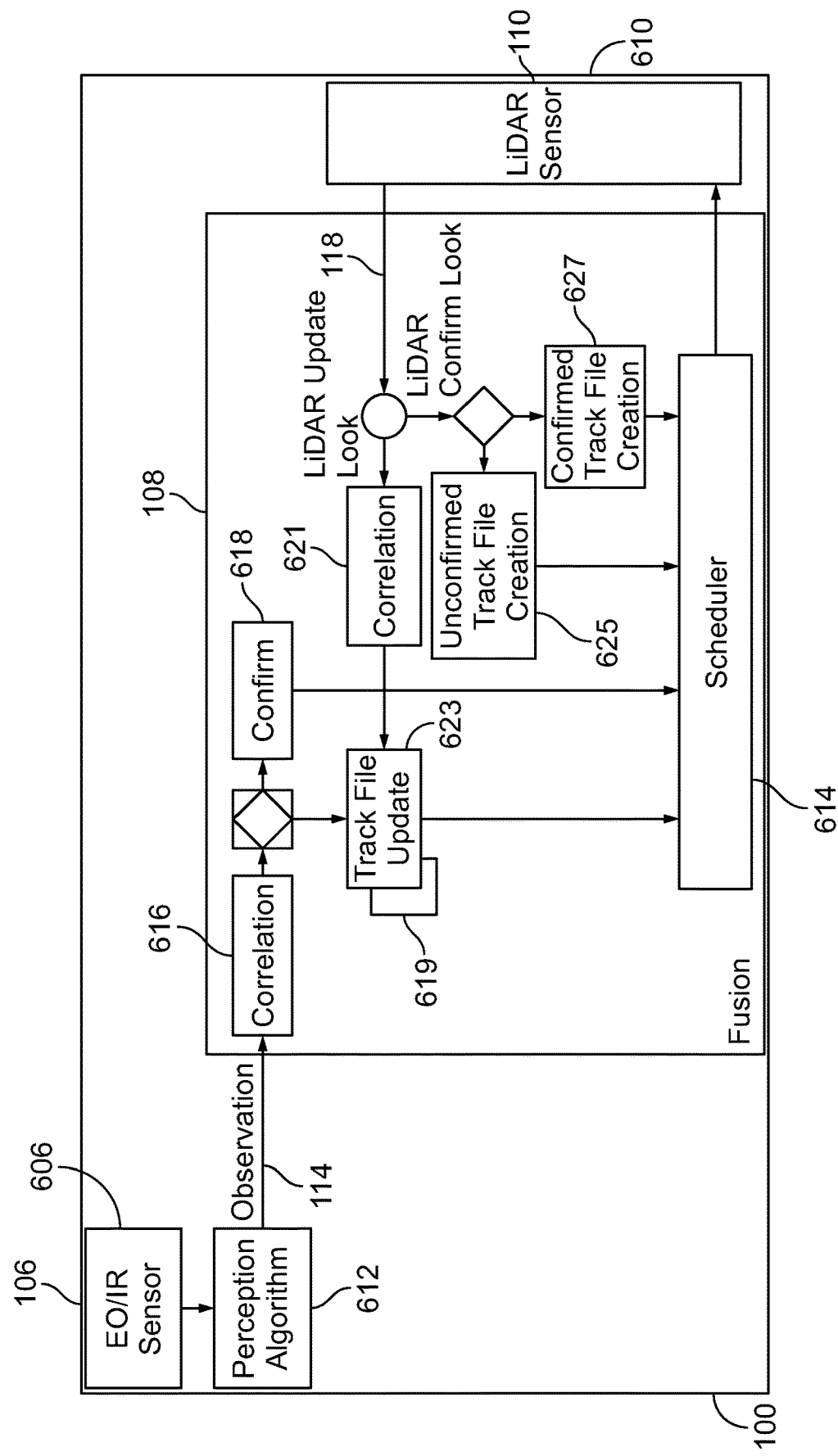
FIG. 7 illustrates a schematic block diagram of the system for tracking the object within an air space, according to an example of the subject disclosure.

FIG. 7 illustrates a schematic block diagram of the system 100 for tracking the object within an air space, according to an example of the subject disclosure. As shown, the first sensor 106 is an EO/IR sensor 606, and the second sensor 110 is a LIDAR sensor 610. The example shown in FIG. 7 is merely one example, and is non-limiting.

A perception algorithm 612 can be stored in a memory, such as the memory of, or otherwise coupled to, the tracking control unit 108. In at least one example, the tracking control unit 108 includes a scheduler 614.

The perception algorithm 612 produces observations from EO/IR video data as acquired by the EO/IR sensor 606. The observations are included within the observation signal 114 that is output by the EO/IR sensor 606 and received by the tracking control unit 108.

Upon receiving the observation data 114, the tracking control unit 108 provides a correlation 616. In the correlation 616, the tracking control unit 108 correlates the observations within the observation signal 114 from the EO/IR sensor 606 with existing track files. If the correlation (including the observations and the measurements) cannot be associated with any track files, a confirm look 618 is scheduled. If the track file cannot be correlated, the track file can be flagged as needing to be confirmed. If the track file is correlated, the tracking control unit 108 updates the track file with the correlation, such as by using a Kalman filter 619.

The scheduler 614 accounts for all the track files, accounts for confirm look commands, determines priority, and schedules the LIDAR sensor 610 to point at the track file having the highest priority. If a last scheduled LIDAR look was to update a track file, data within the tracking signal 118 is run through correlation 621 and, if it is correlated, the track file is updated to track file update 623. If the last scheduled LIDAR look was to confirm a track file, the tracking control unit 108 creates an unconfirmed track file 625 if the track file could not be confirmed, or creates a confirmed track 627 if the track file is confirmed. As an example, an unconfirmed track file has angular position and angular rates.

In at least one example, new tracks are created via observations from the EO/IR sensor 106, and the LIDAR sensor 610 serves to do the initial unconfirmed/confirmed track file creation. As EO/IR observations against existing track files (confirmed and unconfirmed) are made, LIDAR updates are made based off priority calculated in the scheduler 614. A successful LIDAR reading on an unconfirmed track file can upgrade the unconfirmed track to a confirmed track.

In at least one example, the EO/IR sensor 606 makes observations, which are correlated to existing track files. Any uncorrelated observations are then sent to the scheduler 614, which commands the LIDAR sensor 610 to confirm such uncorrelated observations. If the observation is confirmed, a confirmed track file (high priority) is created. If not, an unconfirmed track file (low priority) is created. At the same time, the scheduler 614 or another portion of the tracking control unit 108 commands the LIDAR sensor 610 to update existing track files, and periodically attempts to confirm existing unconfirmed track files.

In at least one example, the tracking control unit 108 determines priority of the order of measurements. In at least one example, scheduler instructions are used for analyzing the track prioritization and determining where to point the second sensor, such as the LIDAR sensor 610.

In at least one example, track files can be prioritized based on various criteria. For example, confirmed tracks can be updated on a prioritized basis if the confirmed tracks have the potential to be on a collision course with the ownship aircraft. As another example, confirmed tracks can be updated on a prioritized basis if the confirmed track is an aircraft or aircraft-like. Updates can also be performed based off of Kalman filter errors. Confirmation of a potential new track can also be prioritized. As another example, a prioritized update can occur when checking to see if an unconfirmed track can be upgraded to a confirmed track.

In at least one example, determining if a track is aircraft-like involves fusing data from both sensors and any additional sensors. For example, if there is ADS-B data that can be correlated with a track file, the track file is most likely an aircraft. If the velocity of the track file falls within a predetermined range and the infrared irradiance of the track also falls within a predetermined range, the track file is more likely to be an aircraft (because something like a building does not move and is likely not as hot as an engine).

Referring to FIGS. 1-7, examples of the subject disclosure provide systems and methods that allow large amounts of data to be quickly and efficiently analyzed by a computing device. For example, numerous objects 102 within an air space 104 can be tracked relative to the aircraft 112. The objects 102 are tracked and monitored, as described herein. As such, large amounts of data are being tracked and analyzed. The vast amounts of data are efficiently organized and/or analyzed by the tracking control unit 108, as described herein. The tracking control unit 108 analyzes the data in a relatively short time in order to quickly and efficiently detect positions, trajectories, air speeds, and the like of the objects 102 relative to the aircraft 112. A human being would be incapable of efficiently analyzing such vast amounts of data in such a short time. As such, examples of the subject disclosure provide increased and efficient functionality, and vastly superior performance in relation to a human being analyzing the vast amounts of data.

In at least one example, components of the system 100, such as the tracking control unit 108, provide and/or enable a computer system to operate as a special computer system for tracking one or more objects 102 relative to the aircraft 112 within the air space 104.

Figure 8:
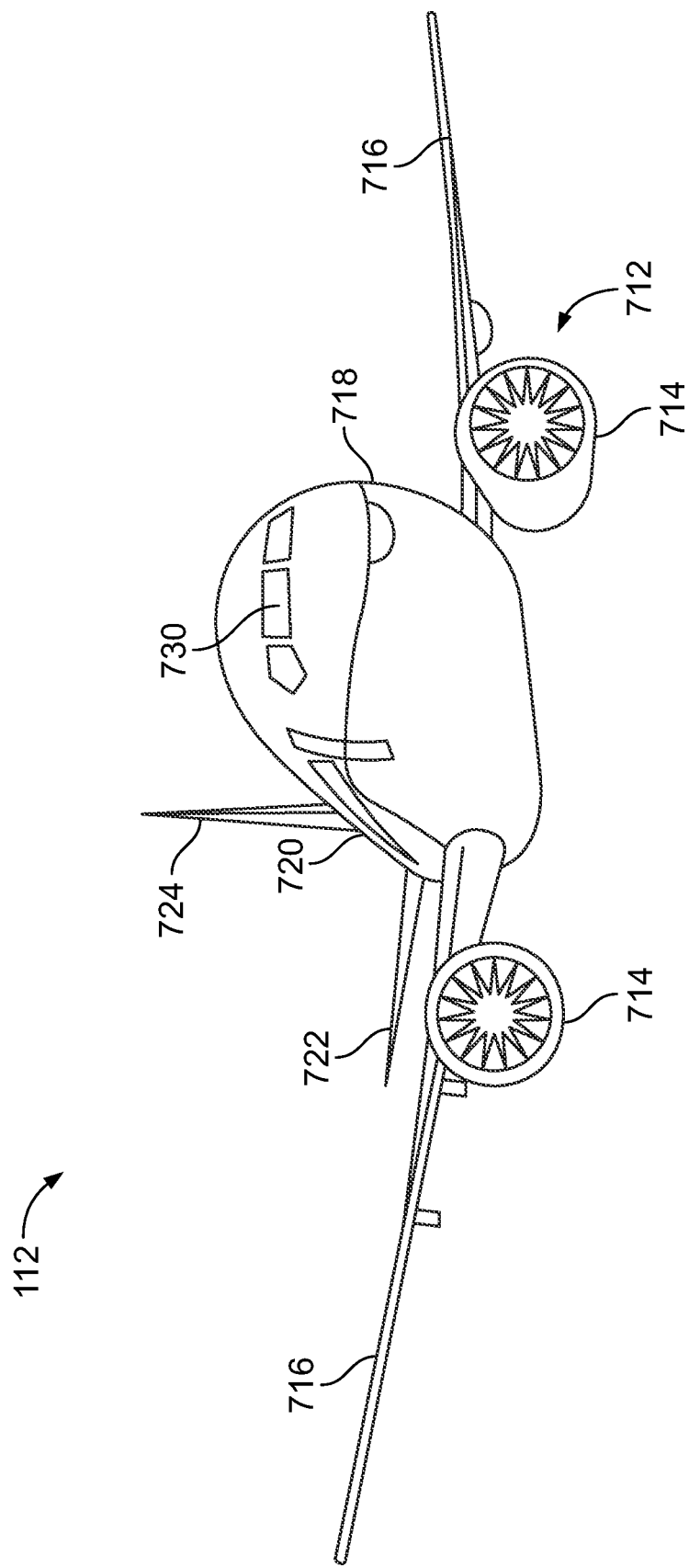
FIG. 8 illustrates a front perspective view of an aircraft, according to an exemplary example of the subject disclosure.

FIG. 8 illustrates a front perspective view of the aircraft 112, according to an exemplary example of the subject disclosure. The aircraft 112 includes a propulsion system 712 that can include two engines 714, for example. Optionally, the propulsion system 712 can include more engines 714 than shown. The engines 714 are carried by wings 716 of the aircraft 112. In other examples, the engines 714 can be carried by a fuselage 718 and/or an empennage 720. The empennage 720 can also support horizontal stabilizers 722 and a vertical stabilizer 724. The fuselage 718 of the aircraft 112 defines an internal cabin, which can include a cockpit 730, one or more work sections (for example, galleys, personnel carry-on baggage areas, and the like), and/or one or more passenger sections.

Optionally, the aircraft 112 can be sized, shaped, and configured differently than shown. As an example, the aircraft 112 can be a helicopter. As another example, the aircraft 112 can be a UAV.

Figure 9:
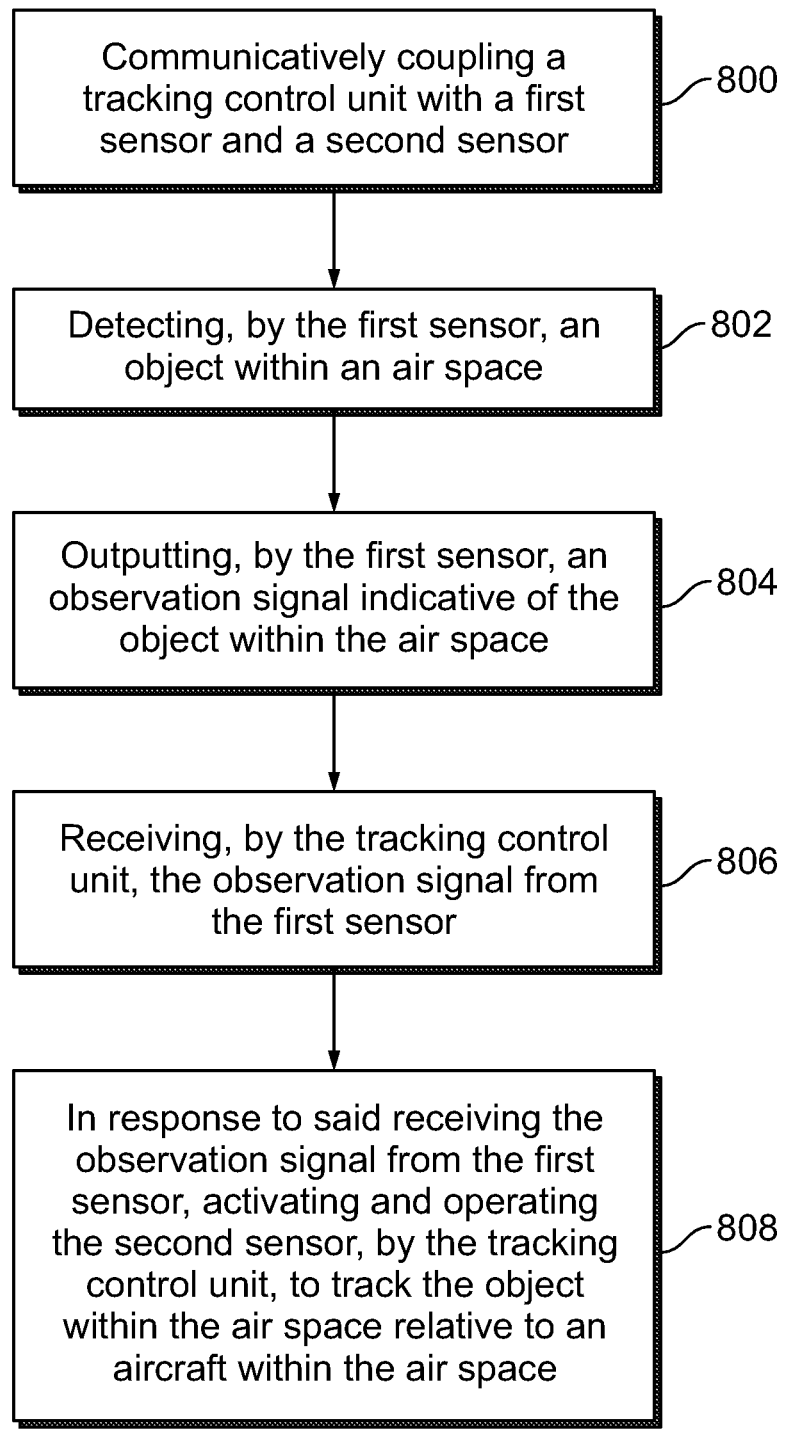
FIG. 9 illustrates a flow chart of method for tracking an object within an air space, according to an example of the subject disclosure.

FIG. 9 illustrates a flow chart of method for tracking an object within an air space, according to an example of the subject disclosure. Referring to FIGS. 1-9, the method includes communicatively coupling, at 800, the tracking control unit 108 with the first sensor 106 and the second sensor 110; detecting, at 802, by the first sensor 106, the object 102 within the air space 104; outputting, at 804, by the first sensor 106, the observation signal 114 indicative of the object 102 within the air space 104; receiving, at 806, by the tracking control unit 108, the observation signal 114 from the first sensor 106, in response to said receiving 806 the observation signal 114 from the first sensor 106, activating and operating, at 808, the second sensor 110, by the tracking control unit 108, to track the object 102 within the air space 104 relative to an aircraft 112 within the air space 104.

In at least one example, the method also includes determining, by the tracking control unit 108, a priority of actions to take in relation to the object 102 based, at least in part, on the tracking signal received from the second sensor 110.

In at least one example, the method also includes receiving, by the tracking control unit 108, the tracking signal 118 from the second sensor 110; and correlating, by the tracking control unit 108, observation data of the observation signal 114 with tracking data of the tracking signal.

In at least one example, the method also includes comparing, by the tracking control unit 108, the track file with confirmation data stored in a memory to determine whether the track file is confirmed or unconfirmed.

In at least one example, the method also includes in response to determining that the track file is confirmed, computing, by the tracking control unit 108, a velocity and a position of the object 102 within the air space 104. For example, said computing includes using the observation signal 114 from the first sensor 106 and the tracking signal 118 from the second sensor 110.

In at least one example, the method also includes updating, by the tracking control unit 108, the track file based on priority of the track file.

Further, the disclosure comprises examples according to the following clauses:

Clause 1. A system comprising:
  a first sensor configured to detect an object within an air space, and output an observation signal indicative of the object within the air space;
  a second sensor configured to track the object within the air space, and output a tracking signal of the object within the air space; and
  a tracking control unit in communication with the first sensor and the second sensor,
  wherein the tracking control unit is configured to receive the observation signal from the first sensor, and
  wherein, in response to receiving the observation signal from the first sensor, the tracking control unit is configured to operate the second sensor to track the object within the air space relative to an aircraft within the air space.

Clause 2. The system of Clause 1, wherein the tracking control unit is further configured to determine a priority of actions to take in relation to the object based, at least in part, on the tracking signal received from the second sensor.

Clause 3. The system of Clauses 1 or 2, wherein the tracking control unit is further configured to:
  receive the tracking signal from the second sensor, and
  correlate observation data of the observation signal with tracking data of the tracking signal.

Clause 4. The system of Clause 3, wherein the tracking control unit is further configured to determine whether a track file is confirmed or unconfirmed.

Clause 5. The system of Clauses 3 or 4, wherein the tracking control unit is further configured to, in response to determining that the track file is confirmed, compute a velocity and a position of the object within the air space.

Clause 6. The system of Clause 5, wherein the tracking control unit is further configured to compute the velocity and the position of the object within the air space by using the observation signal from the first sensor and the tracking signal from the second sensor.

Clause 7. The system of any of Clauses 3-6, wherein the tracking control unit is further configured to update the track file based on priority of the track file.

Clause 8. The system of Clause 7, wherein a first priority of the track file, if confirmed, is higher than a second priority of the track file, if unconfirmed.

Clause 9. The system of any of Clauses 1-8, wherein the first sensor is an electro-optical/infrared (EO/IR) sensor, and wherein the second sensor is a light detection and ranging (LIDAR) sensor.

Clause 10. The system of any of Clauses 1-9, wherein the aircraft comprises the first sensor, the second sensor, and the tracking control unit.

Clause 11. A method comprising:
  receiving, by a tracking control unit, an observation signal from a first sensor in communication the tracking control unit; and
  in response to said receiving the observation signal from the first sensor, operating, by the tracking control unit, a second sensor to track the object within the air space relative to an aircraft within the air space.

Clause 12. The method of Clause 11, further comprising determining, by the tracking control unit, a priority of actions to take in relation to the object based, at least in part, on the tracking signal received from the second sensor.

Clause 13. The method of Clauses 11 or 12, further comprising:
  receiving, by the tracking control unit, a tracking signal from the second sensor; and
  correlating, by the tracking control unit, observation data of the observation signal with tracking data of the tracking signal.

Clause 14. The method of Clause 13, further comprising determining, by the tracking control unit, whether a track file is confirmed or unconfirmed.

Clause 15. The method of Clause 14, further comprising, in response to determining that the track file is confirmed, computing, by the tracking control unit, a velocity and a position of the object within the air space.

Clause 16. The method of Clause 15, wherein said computing comprises using the observation signal from the first sensor and the tracking signal from the second sensor.

Clause 17. The method of any of Clauses 14-16, further comprising updating, by the tracking control unit, the track file based on priority of the track file.

Clause 18. The method of any of Clauses 11-18, wherein the first sensor is an electro-optical/infrared (EO/IR) sensor, and wherein the second sensor is a light detection and ranging (LIDAR) sensor.

Clause 19. The method of any of Clauses 11-18, wherein the aircraft comprises the first sensor, the second sensor, and the tracking control unit.

Clause 20. A non-transitory computer-readable storage medium comprising executable instructions that, in response to execution, cause one or more control units comprising a processor, to perform operations comprising:
  receiving, by a tracking control unit, an observation signal from a first sensor; and
  in response to said receiving the observation signal from the first sensor, operating a second sensor, by the tracking control unit, to track the object within the air space relative to an aircraft within the air space.

Clause 21. The non-transitory computer-readable storage medium of Clause 20, further comprising determining, by the tracking control unit, a priority of actions to take in relation to the object based, at least in part, on the tracking signal received from the second sensor.

Clause 22. The non-transitory computer-readable storage medium of Clauses 21 or 22, wherein the executable instructions, in response to execution, cause the one or more control units comprising the processor to perform further operations comprising:

receiving, by the tracking control unit, a tracking signal from the second sensor, correlating, by the tracking control unit, observation data of the observation signal with tracking data of the tracking signal;

determining, by the tracking control unit, whether a track file is confirmed or unconfirmed;

in response to determining that the track file is confirmed, computing, by the tracking control unit, a velocity and a position of the object within the air space; and updating, by the tracking control unit, the track file based on priority of the track file.

As described herein, examples of the subject disclosure provide systems and methods for accurately and effectively tracking objects within an air space. The systems and methods are less susceptible to false positives and background noise as compared to known EO/IR systems.

While various spatial and directional terms, such as top, bottom, lower, mid, lateral, horizontal, vertical, front and the like can be used to describe examples of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
   a first sensor configured to detect an object within an air space, and output an observation signal indicative of the object within the air space;
   a second sensor configured to track the object within the air space, and output a tracking signal associated with the object within the air space; and
   a tracking control unit in communication with the first sensor and the second sensor,
   wherein the tracking control unit is configured to receive the observation signal from the first sensor,
   wherein, in response to receiving the observation signal from the first sensor, the tracking control unit is configured to operate the second sensor to track the object within the air space relative to an aircraft within the air space, and
   wherein the tracking control unit is further configured to determine a priority of actions to take in relation to the object based on the tracking signal,
   wherein the tracking control unit is further configured to:
      confirm a first track file in response to the tracking signal being within a predetermined range, wherein the first track file has a first priority, and
      determine a second track file as unconfirmed in response to the tracking signal being outside the predetermined range, wherein the second track file has a second priority, and wherein the first priority is higher than the second priority.

2. The system of claim 1, wherein the tracking control unit is further configured to:
   receive the tracking signal from the second sensor, and
   correlate observation data of the observation signal with tracking data of the tracking signal.

3. The system of claim 2, wherein the tracking control unit is further configured to, in response to determining that the first track file is confirmed, compute a velocity and a position of the object within the air space.

4. The system of claim 3, wherein the tracking control unit is further configured to compute the velocity and the position of the object within the air space by using the observation signal from the first sensor and the tracking signal from the second sensor.

5. The system of claim 1, wherein the first sensor is an electro-optical/infrared (EO/IR) sensor, and wherein the second sensor is a light detection and ranging (LIDAR) sensor.

6. The system of claim 1, wherein the aircraft comprises the first sensor, the second sensor, and the tracking control unit.

7. The system of claim 1, wherein the tracking control unit is further configured to periodically check the second track file with increasing frequency in response to determining that the object is aircraft-like.

8. The system of claim 7, wherein the tracking control unit is further configured to determine that the object is aircraft-like in response to the object having a predetermined velocity, a predetermined shape, and a predetermined infrared signature.

9. The system of claim 1, wherein the tracking control unit is further configured to schedule updates to range measurements based on the first priority of the first track file, the second priority of the second track file, and a third priority of a third track file, wherein the third priority is less than the second priority, wherein first track file indicates that the object is another aircraft, wherein the second track file indicates that the object is an unconfirmed aircraft-like object, and wherein the third track file indicates that the object is not aircraft-like.

10. A method comprising:
  detecting, by a first sensor, an object within an air space;
  outputting, by the first sensor, an observation signal indicative of the object within the air space;
  receiving, by a tracking control unit, the observation signal from the first sensor;
  in response to said receiving the observation signal from the first sensor, operating, by the tracking control unit, a second sensor to track the object within the air space relative to an aircraft within the air space;
  tracking, by the second sensor, the object within the air space;
  outputting, by the second sensor, a tracking signal associated with the object within the air space;
  receiving, by the tracking control unit, the tracking signal from the second sensor; and
  determining, by the tracking control unit, a priority of actions to take in relation to the object based on the tracking signal, wherein said determining comprises:
    confirming a first track file in response to the tracking signal being within a predetermined range, wherein the first track file has a first priority; and
    determining a second track file as unconfirmed in response to the tracking signal being outside the predetermined range, wherein the second track file has a second priority, and wherein the first priority is higher than the second priority.

11. The method of claim 10, further comprising:
  correlating, by the tracking control unit, observation data of the observation signal with tracking data of the tracking signal.

12. The method of claim 10, further comprising, in response to determining that the first track file is confirmed, computing, by the tracking control unit, a velocity and a position of the object within the air space.

13. The method of claim 12, wherein said computing comprises using the observation signal from the first sensor and the tracking signal from the second sensor.

14. The method of claim 10, wherein the first sensor is an electro-optical/infrared (EO/IR) sensor, and wherein the second sensor is a light detection and ranging (LIDAR) sensor.

15. The method of claim 10, wherein the aircraft comprises the first sensor, the second sensor, and the tracking control unit.

16. The method of claim 10, further comprising periodically checking, by the tracking control unit, the second track file with increasing frequency in response to determining that the object is aircraft-like.

17. The method of claim 16, wherein said determining that the object is aircraft-like includes determining that the object has a predetermined velocity, a predetermined shape, and a predetermined infrared signature.

18. The method of claim 10, further comprising scheduling, by the tracking control unit, updates to range measurements based on the first priority of the first track file, the second priority of the second track file, and a third priority of a third track file, wherein the third priority is less than the second priority, wherein the first track file indicates that the object is another aircraft, wherein the second track file indicates that the object is an unconfirmed aircraft-like object, and wherein the third track file indicates that the object is not aircraft-like.

19. An aircraft comprising:
  a first sensor configured to detect an object within an air space, and output an observation signal indicative of the object within the air space;
  a second sensor configured to track the object within the air space, and output a tracking signal associated with the object within the air space; and
  a tracking control unit in communication with the first sensor and the second sensor,
  wherein the tracking control unit is configured to:
    receive the observation signal from the first sensor,
    in response to receiving the observation signal from the first sensor, operate the second sensor to track the object within the air space relative to the aircraft within the air space,
    receive the tracking signal from the second sensor,
    correlate observation data of the observation signal with tracking data of the tracking signal,
    determine a priority of actions to take in relation to the object based on the tracking signal,
    confirm a first track file in response to the tracking signal being within a predetermined range, wherein the first track file has a first priority, and
    determine a second track file as unconfirmed in response to the tracking signal being outside the predetermined range, wherein the second track file has a second priority, and wherein the first priority is higher than the second priority.

20. The aircraft of claim 19, wherein the tracking control unit is further configured to periodically check the second track file with increasing frequency in response to determining that the object is aircraft-like.

21. The aircraft of claim 20, wherein the tracking control unit is further configured to determine that the object is aircraft-like in response to the object having a predetermined velocity, a predetermined shape, and a predetermined infrared signature.

22. The aircraft of claim 19, wherein the tracking control unit is further configured to schedule updates to range measurements based on the first priority of the first track file, the second priority of the second track file, and a third priority of a third track file, wherein the third priority is less than the second priority, wherein first track file indicates that the object is another aircraft, wherein the second track file indicates that the object is an unconfirmed aircraft-like object, and wherein the third track file indicates that the object is not aircraft-like.

* * * * *